(12) United States Patent
Canal Vila et al.

(10) Patent No.: US 12,352,236 B2
(45) Date of Patent: Jul. 8, 2025

(54) DEVICE AND METHOD FOR MITIGATING VIBRATIONS IN WIND TURBINE BLADES

(71) Applicant: LM WIND POWER A/S, Kolding (DK)

(72) Inventors: Marc Canal Vila, Barcelona (ES); Jesper Madsen, Lunderskob (DK)

(73) Assignee: LM WIND POWER A/S, Kolding (DK)

(*) Notice: Subject to any disclaimer, the term of this patent is extended or adjusted under 35 U.S.C. 154(b) by 0 days.

(21) Appl. No.: 18/291,211

(22) PCT Filed: Jul. 22, 2022

(86) PCT No.: PCT/EP2022/070664
§ 371 (c)(1),
(2) Date: Jan. 22, 2024

(87) PCT Pub. No.: WO2023/002034
PCT Pub. Date: Jan. 26, 2023

(65) Prior Publication Data
US 2024/0360813 A1 Oct. 31, 2024

(30) Foreign Application Priority Data
Jul. 23, 2021 (EP) .................................... 21382681

(51) Int. Cl.
*F03D 1/06* (2006.01)
(52) U.S. Cl.
CPC ...... *F03D 1/0688* (2023.08); *F05B 2240/303* (2020.08); *F05B 2260/96* (2013.01)
(58) Field of Classification Search
CPC .... F03D 1/0688; F03D 1/0675; F03D 1/0658; F03D 1/065; F03D 1/066; F03D 1/0662; F03D 1/0664; F03D 1/0667; F03D 1/0669; F03D 1/0671; F03D 7/0296; F03D 7/0298; F03D 7/0302; F03D 7/015; F03D 7/016; F03D 7/017; F03D 7/028; F03D 7/0285; F03D 7/029; F03D 7/031; F03D 7/032;
(Continued)

(56) References Cited

U.S. PATENT DOCUMENTS 8,595,931 B2* 12/2013 Riddell ................. F03D 1/0633
29/889.6
8,777,580 B2* 7/2014 Eisenberg ............. F03D 1/0641
416/239

(Continued)

FOREIGN PATENT DOCUMENTS

EP 3112667 A1 1/2017
EP 3795824 A1 3/2021
(Continued)

*Primary Examiner* — Nathaniel E Wiehe
*Assistant Examiner* — Wayne A Lambert
(74) *Attorney, Agent, or Firm* — Nath, Goldberg & Meyer; Jerald L. Meyer (57) ABSTRACT

The present disclosure relates to devices for wind turbine blades and methods for reducing vibrations in wind turbines with a rotor in standstill. A device comprises a portion configured to protrude beyond a leading edge of a wind turbine blade in a local chordwise direction. The portion configured to protrude beyond the leading edge is configured to at least partially form an air channel in front of the leading edge.

14 Claims, 4 Drawing Sheets

(58) Field of Classification Search
CPC .......... F03D 7/033; F03D 7/034; F03D 7/036; F03D 80/005; F05B 2260/96; F05B 2260/964; F05B 2270/334
See application file for complete search history.

(56) References Cited

U.S. PATENT DOCUMENTS

| | | | |
|---|---|---|---|
| 9,670,902 B2* | 6/2017 | Philipsen | F03D 1/0675 |
| 10,288,039 B2* | 5/2019 | Chen | F03D 80/50 |
| 10,337,540 B2* | 7/2019 | Wardropper | F03D 80/50 |
| 2009/0142193 A1* | 6/2009 | Bech | F03D 1/0675 |
| | | | 416/241 A |
| 2010/0139062 A1* | 6/2010 | Reed | F03D 13/10 |
| | | | 29/889.1 |
| 2010/0143152 A1* | 6/2010 | Subramanian | F03D 1/06 |
| | | | 29/889.71 |
| 2012/0301293 A1* | 11/2012 | Bech | F03D 13/10 |
| | | | 416/1 |
| 2021/0079896 A1* | 3/2021 | Herrig | F03D 80/00 |
| 2023/0287863 A1* | 9/2023 | Herrig | F03D 1/0675 |

FOREIGN PATENT DOCUMENTS

| | | |
|---|---|---|
| GB | 2475865 A | 6/2011 |
| WO | 2016/107624 A1 | 7/2016 |
| WO | 2019/015731 A1 | 1/2019 |

\* cited by examiner

DEVICE AND METHOD FOR MITIGATING VIBRATIONS IN WIND TURBINE BLADES

This is a National Phase Application filed under 35 U.S.C. 371 as a national stage of PCT/EP2022/070664, filed Jul. 22, 2022, an application claiming the benefit of European Application No. 21382681.1, filed Jul. 23, 2021, the content of each of which is hereby incorporated by reference in its entirety.

The present application claims the benefit of EP21382681.1 filed on Jul. 23, 2021.

The present disclosure relates to devices for wind turbine blades and methods for reducing vibrations in wind turbines. More particularly, the present disclosure relates to devices for mitigating vortex induced vibrations and stall induced vibrations, and methods for reducing wind turbine vibrations when the wind turbine is parked, especially during wind turbine installation and/or maintenance.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through the use of a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that may contain and protect the gearbox (if present) and the generator (if not placed outside the nacelle) and, depending on the wind turbine, further components such as a power converter, and auxiliary systems.

There is a trend to make wind turbine blades increasingly longer to capture more wind and convert the energy of the wind into electricity. That makes blades more flexible and more prone to vibrations of the blades. Wind turbine blades vibrating excessively may get damaged. Vibrations of the rotor blades may also result in the whole wind turbine structure oscillating e.g. fore-aft oscillations, or sideways oscillations. Vibrations in the wind turbine blade may also damage other components of the wind turbine due to excessive stress.

When the wind turbine is in operation (i.e. producing energy and connected to an electrical grid), a wind turbine controller may operate auxiliary drive systems such as a pitch system or a yaw system to reduce or change loads on the blades. This way, vibrations of the blades may be counteracted. However, the problem of vibrations can be serious as well in circumstances when the wind turbine is parked and disconnected from the grid.

When a wind turbine is parked, the wind may blow against the wind turbine from unusual directions, i.e. different from when in normal operation. The airflow around the wind turbine may cause the wind turbine to vibrate. Vibrations may stress and even damage one or more wind turbine components, which may compromise the performance of the wind turbine, can increase the need of reparations and reduce the lifespan of the wind turbine. As an orientation of a wind turbine blade cannot be adapted to the direction of the incoming wind, e.g. through yawing and/or pitching as opposed to when the wind turbine is operating, the effects of vibrations may be greater or different when the wind turbine is parked than when the wind turbine is operating normally and producing energy.

In particular, this may apply when the wind turbine is being installed or commissioned. For example, it may happen that an incomplete rotor is installed (e.g. a rotor having a single blade or two blades out of the total of three blades). The remaining blades may not be installed until a few days or a week later. In the meantime, the partially installed (or "incomplete") rotor may be in standstill. The rotor may or may not be locked, and the wind turbine can be exposed to varying wind conditions. This may likewise apply if the wind turbine is stopped during several hours, days or weeks, e.g. for maintenance reasons. A wind turbine blade can start to vibrate in any of these conditions depending particularly on the direction of the wind.

SUMMARY

In an aspect of the present disclosure, a device configured to be removably mounted to a wind turbine blade having a root, a tip and exterior surfaces defining a pressure side, a suction side, a leading edge and a trailing edge, each surface extending in a generally spanwise direction from the root the tip, is provided. The device is configured for mitigating vibrations when a rotor of a wind turbine is in standstill. The device comprises a portion configured to protrude in a local chordwise direction beyond the leading edge of the wind turbine blade. The portion configured to protrude beyond the leading edge is configured to at least partially form an air channel in front of the leading edge.

According to this aspect, the portion configured to protrude from the leading edge may change the air flowing around the wind turbine blade. In particular, the air channel in front of the leading edge may lead the air flow away from the wind turbine blade such that air flowing around a leading edge and around a trailing edge may not be combined over the blade after leaving behind the leading and trailing edges.

As the juxtaposition of air flow and vortex filaments may be reduced when compared to a situation without the presence of the device, vibrations such as vortex and/or stall induced vibrations may be avoided or at least reduced.

Throughout the present disclosure, the terms "standstill" and "parked" are used interchangeably, and may be understood as a situation in which the wind turbine is not producing electricity, and the rotor is substantially standing still. The rotor may or may not be locked in standstill. For instance, a wind turbine may be parked or in standstill during installation and/or commissioning. A wind turbine may also be parked for e.g. maintenance reasons after operating normally, i.e. producing energy, or in case of a prolonged grid loss.

Throughout the present disclosure, protruding beyond the leading (trailing) edge in a local chordwise direction may mean that a portion configured to protrude beyond the leading (trailing) edge is arranged in front of (behind) the leading (trailing) edge. In some examples, the protruding portion may extend along an axis having an angle α between −60° to +60° with a local chord, more in particular between −45° and +45°, and more in particular between −20° and +20°. Such angle may be measured in a plane including a local chordwise direction and substantially perpendicular to a local leading (trailing) edge direction. A local chordwise direction may therefore represent 0°.

In a further aspect of the disclosure, a method for mitigating vibrations of a parked wind turbine comprising one or more wind turbine blades is provided. A wind turbine blade comprises a root, a tip and exterior surfaces defining a pressure side, a suction side, a leading edge and a trailing edge, each surface extending in a generally spanwise direction from the root the tip. The method comprises releasably attaching a device comprising a portion configured to protrude in a local chordwise direction beyond the leading edge of the wind turbine blade to the leading edge of a wind turbine blade. The portion configured to protrude beyond the leading edge is configured to at least partially form an air channel in front of the leading edge.

Still in a further aspect of the disclosure, a device configured to be removably mounted to a wind turbine blade having a root, a tip and exterior surfaces defining a pressure side, a suction side, a leading edge and a trailing edge, each surface extending in a generally spanwise direction from the root the tip, is provided. The device is configured for mitigating vibrations when a rotor of a wind turbine is in standstill. The device comprises a portion configured to protrude in a local chordwise direction beyond the leading edge of the wind turbine blade. The portion configured to protrude beyond the leading edge is configured to at least partially form a leading air channel in front of the leading edge. The device further comprises a portion configured to protrude in a local chordwise direction beyond the trailing edge of the wind turbine blade. The portion configured to protrude beyond the trailing edge is configured to at least partially form a trailing air channel behind the trailing edge.

DETAILED DESCRIPTION OF EXAMPLES

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
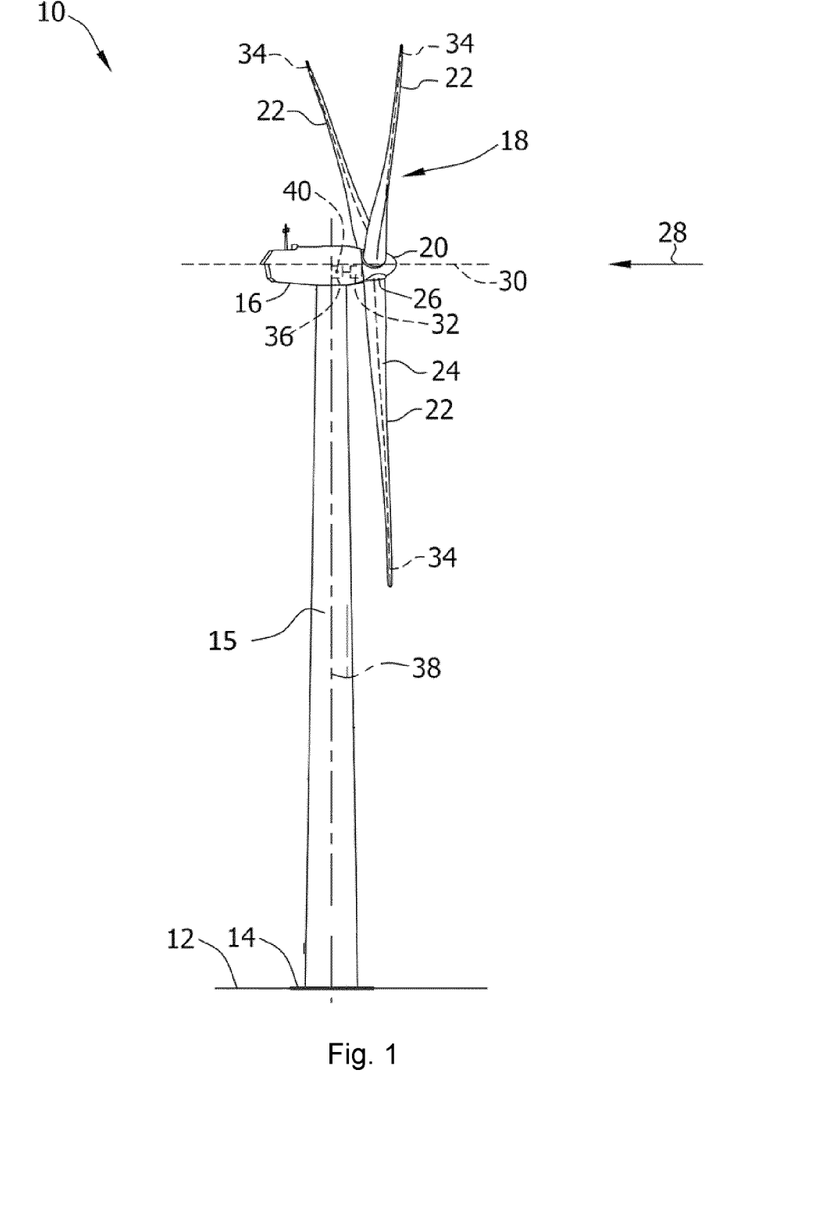
FIG. 1 illustrates a perspective view of one example of a wind turbine.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root region 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
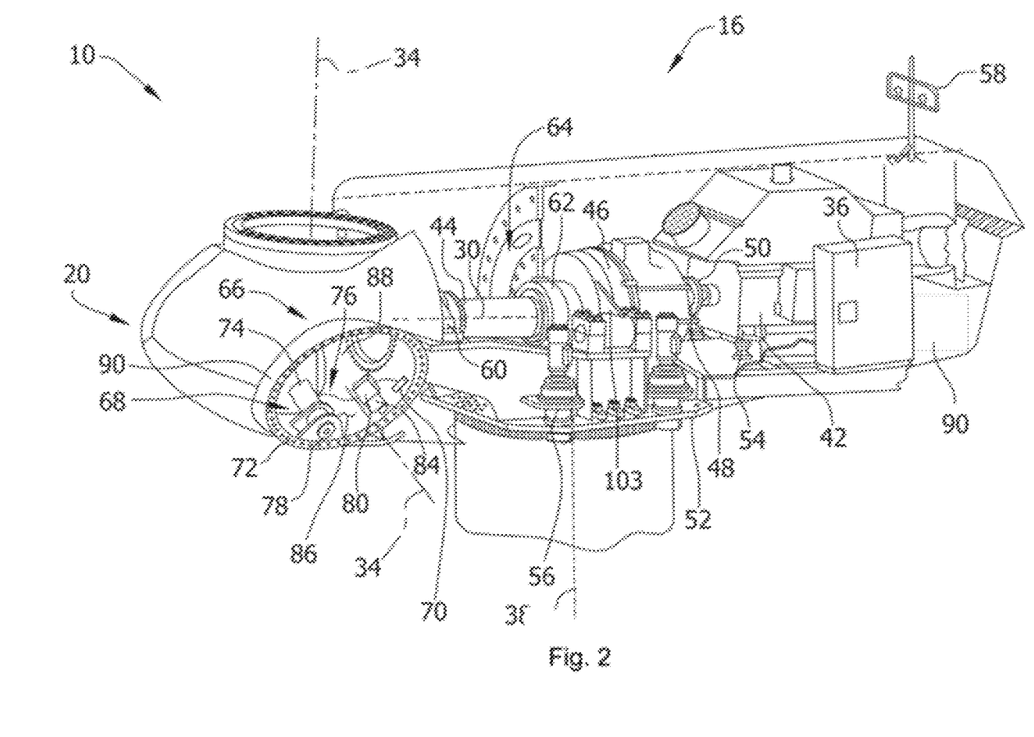
FIG. 2 illustrates a simplified, internal view of one example of the nacelle of the wind turbine of the FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3:
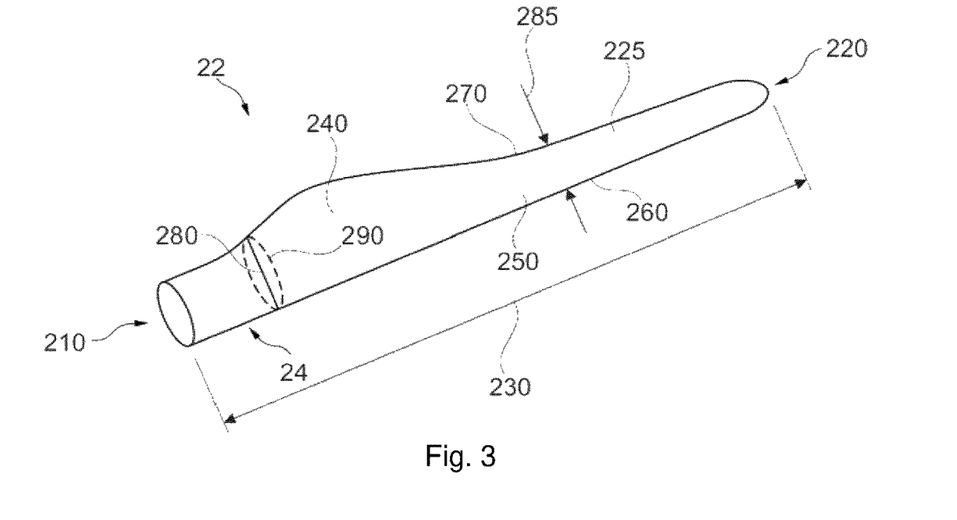
FIG. 3 illustrates a schematic perspective view of a wind turbine blade shown in FIG. 1.

A schematic perspective view of a wind turbine blade 22, e.g. one of the rotor blades 22 shown in FIG. 1, is illustrated as an example in FIG. 3. The rotor blade 22 includes a blade root 210, a blade tip 220, a leading edge 260 and a trailing edge 270. The blade root 210 is configured for mounting the rotor blade 22 to the hub 20 of a wind turbine 10. The wind turbine blade 22 extends lengthwise between the blade root 210 and the blade tip 220. A span 230 defines a length of the rotor blade 22 between said blade root 210 and blade tip 220. A chord 280 at a given position of the blade is an imaginary straight line joining the leading edge 260 and the trailing edge 270, the cross-section generally having airfoil shaped cross-section. As is generally understood, a chordwise direction is substantially perpendicular to a spanwise direction. Also, the chord 280 may vary in length 285 as the rotor blade 120 extends from the blade root 210 to the blade tip 220. The wind turbine blade 22 also includes a pressure side 240 and a suction side 250 extending between the leading edge 260 and the trailing edge 270. A tip region 225 may be understood as a portion of a wind turbine blade 22 that includes the tip 220. A tip region may have a length of 33%, 30%, or 25% of the span or less. A root region 24 may be understood as a portion of the blade that includes root 210. A root region may have a length of e.g. 33%, 30% of the span or less.

The rotor blade 22, at different spanwise positions, has different aerodynamic profiles and thus can have airfoil shaped cross-sections 290, such as a symmetrical or cambered airfoil-shaped cross-section. Close to a root of the blade, the cross-section of the blade may be rounded, even circular or almost circular. Closer to a tip of the blade, the cross-section of the blade may be thinner and may have an airfoil shape.

When a wind turbine is parked or stopped, vibrations caused by the air flowing around the wind turbine, in particular around the wind turbine blades, may stress and damage the wind blades and the wind turbine. The wind turbine rotor may or may not be locked in these situations.

At least two types of oscillations or vibrations may happen particularly when the turbine is parked. The first ones are so-called vortex induced vibrations (VIVs), and may arise when an angle of attack for a blade or airfoil portion is around 90 degrees. Vortex shedding may contribute to enhance the wind turbine blade oscillation. The second type of oscillations are stall induced vibrations (SIVs), and may arise when the angle of attack is close to stall angles (e.g. −30 degrees to +30 degrees). The angle of attack may be understood as a geometrical angle between a flow direction of the wind and the chord of a rotor blade or a local chord of a rotor blade section.

In a first aspect of the disclosure, a device 300 configured to be removably mounted to a wind turbine blade 22 is provided. The wind turbine blade 22 has a root 210, a tip 220 and exterior surfaces extending in a generally spanwise direction from the root 210 to the tip 220. The exterior surfaces define a pressure side 240, a suction side 250, a leading edge 260 and a trailing edge 270. The device 300 is configured for mitigating vibrations of a wind turbine 10 when a rotor 180 of the wind turbine 10 is in standstill. The device 300 comprises a portion 310 configured to protrude beyond the leading edge 260 in a local chordwise direction. The portion 310 configured to protrude beyond the leading edge 260 is configured to at least partially form an air channel 540 in front of the leading edge 260.

Devices 300 as described herein may reduce vibrations when the wind turbine is parked. The performance of the wind turbine is not negatively affected as the device is normally removed before the wind turbine starts normal operation. Devices 300 may be particularly useful during installation and/or commissioning of a wind turbine. They may also be useful if the wind turbine is stopped, e.g. for maintenance.

In general, the air channel 540 may create a suction peak that may deviate the air flow away from the blade 22. In this way, (a component of) an air flow 515 arriving at the blade with an angle of attack of about 90°, or in general other angles, may be modified by the air channel 540. For example, the direction of propagation of the air flow 515 may be modified. In particular, the air flow 515 may be diverted from the blade 22. A schematic illustration of a device 300 diverting air flow 515 from a wind turbine blade 22 may be seen in FIG. 4B.

Figure 4A:
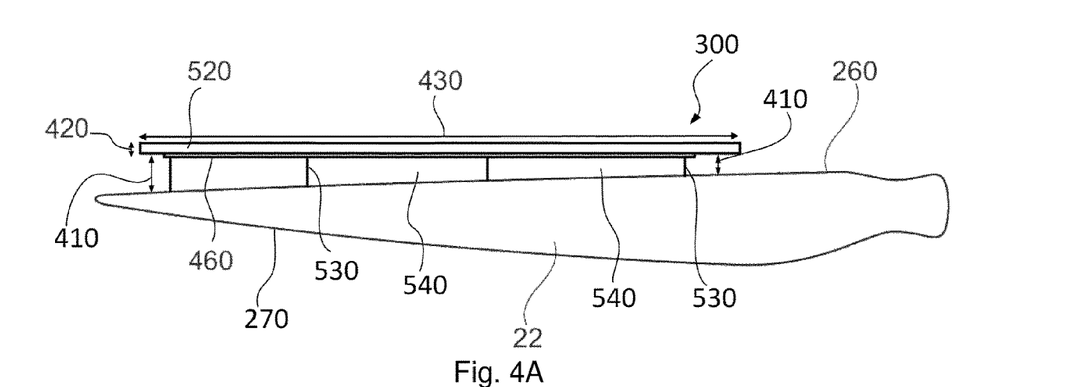
FIGS. 4A and 4C schematically illustrate top views of examples of devices according to the invention arranged on a wind turbine blade.
Figure 4B:
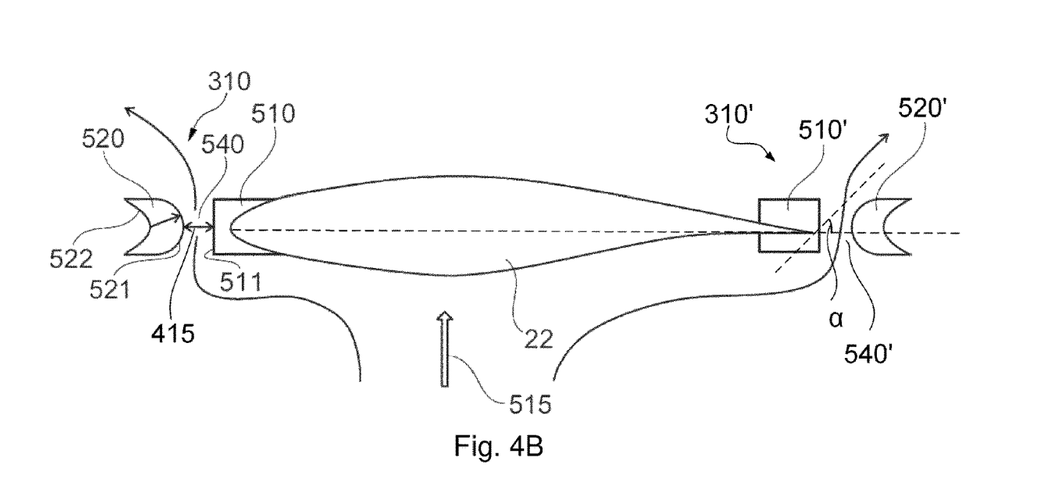
FIG. 4B schematically illustrates a cross-sectional view of a device according to the invention attached to a wind turbine blade.

As the air flow may be deflected from a blade surface, see e.g. the arrows in FIG. 4B, the combination of the air flowing around the leading edge 260 and the air flowing around the trailing edge 270 after leaving the device 300 behind may be avoided or at least reduced. Therefore, the formation of vortices can be avoided or at least reduced.

It should also be noted that the spanwise air flow (or the spanwise component of an air flow) may also be diverted. For example, vortex filaments advancing from the blade tip 220 towards the blade root 210 may be diverted. Device 300 may also help to stall the air flow, which may limit lift forces on the blade and contribute to reduce SIVs.

Figure 4C:
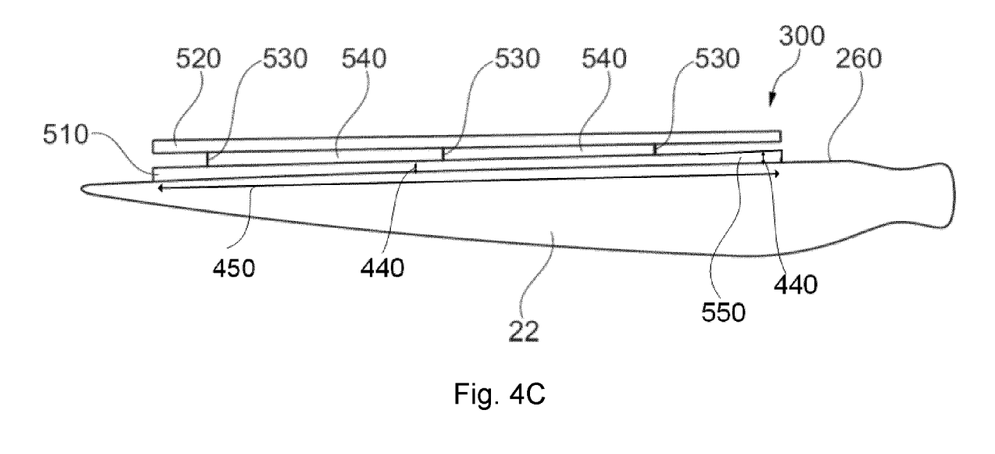

FIGS. 4A to 4C schematically show different examples of devices 300 for reducing vibrations in a wind turbine. In particular, FIGS. 4A and 4C schematically show a top view of a wind turbine blade 22 with two examples of a device 300 attached to the blade 22. FIG. 4B schematically illustrates a cross-sectional view of a wind turbine blade 22 with another example of device 300 attached to the blade 22.

In the example of FIG. 4A, the portion configured to protrude beyond the leading edge 310 comprises a front leading edge element 520 configured to be connected to the leading edge 260 such that the air channel 540 is formed between the front leading edge element 520 and the leading edge 260.

In some examples, the front leading edge element 520 may be configured to be substantially parallel to the leading edge 260. In other words, the front leading edge element 520 may be configured to have a substantially constant distance 410 to the leading edge 260.

In some other examples, as e.g. in the example of FIG. 4A, the front leading edge element 520 may be configured to have a varying distance 410 to the leading edge 260. For example, the device 300 may be configured such that a distance 410 between the front leading edge element 520 and the leading edge 260 increases along a length 230 of a wind turbine blade 22, and in particular towards a root 210 of the blade 22. Increasing a distance 410 between the front leading edge element 520 and the leading edge 260 towards the root region 24 of the blade 22 may help to increase the separation of the vortex filaments from the blade 22 when the air flow advances from the blade tip 220 towards the blade root 210.

In some examples, as e.g. in the example of FIG. 4B, an air channel side 521 of the front leading edge element 521, i.e. a side of the front leading edge element facing an air channel 540, may be convex. In other words, the air channel side 521 of the front leading edge element 520 may protrude towards the leading edge 260, thus creating a reduction of the width 410 of the air channel 540. For example, as illustrated in FIG. 4B, the air channel side 521 of the front leading edge element 520 may be rounded or have a C- or U-shaped contour.

A convex air channel side 521 of the front leading edge element 520 may help to deviate the air flow passing through the air channel 540 away from the wind turbine blade 22. A rounded air channel side 521 may do so more smoothly than a sharp, e.g. triangular, air channel side 521. In other examples, the air channel side 521 of the front leading edge element 520 may be straight or have other shapes.

In some examples, a side 522 of the front leading edge element 520 opposite to the air channel side 521 may be concave, e.g. as shown in the example of FIG. 4B. For example, such a side may have a U or C shape. A concave shape may add drag and may therefore contribute to reduce edgewise oscillations caused by ViV and/or SiV.

As may be seen in FIG. 4A, the device 300 may comprise two or more connectors 530 to join the front leading edge element 520 and the leading edge 260. For example, the device 300 may include two or more connectors 530 such as bars attached to the front leading edge element 520 for joining the front leading edge element 520 to the leading edge 260. The connectors 530 may be substantially perpendicular to a length 430 of the front leading edge element 520, for example as illustrated in the example of FIG. 4A. The connectors 530 and the front leading edge element 520 do not need to be perpendicular in other examples. In some examples, the two or more connectors 530 may be joined to a rail 460 substantially parallel to the front leading edge element 520 and attached to the front leading edge element 520.

The connectors 530 attached to the front leading edge element 520 may have different lengths. For example, a length of the connectors 530 may increase towards a longitudinal end of the front leading edge element 520. An example of this configuration may be seen in FIG. 4A, where a length of the connectors 530 increases from a first longitudinal end to a second opposite longitudinal end of the front leading edge element 520. Accordingly, a distance 410 between the front leading edge element 520 and the leading edge 260 increases towards a tip 220 of the blade 22 in this example. The opposite, i.e. a distance 410 increasing towards the root 210 of the blade 22, may occur in other examples.

In the example of FIG. 4B, the front leading edge element 520 extends along an axis having an angle of about 0° with a local chord. However, in other examples, the front leading edge element 520 may extend along an axis having an angle α between −60° to +60° with the local chord, more in particular between −45° and +45°, and more in particular between −20° and +20°. In some examples, angle α may vary between −10° and +10°, and more in particular between −5° and +5°. Angle α is about 0° in the example of FIG. 4B.

For simplicity, an angle α has been illustrated with respect to a front trailing edge element 520' of a portion 310' of the device 300 protruding beyond the trailing edge 270 in FIG. 4B, but the concept applies both to a portion protruding beyond the leading edge 260 and to a portion protruding beyond the trailing edge 270.

In some examples, as e.g. in FIGS. 4B and 4C, a portion 310 configured to protrude beyond the leading edge 260 further comprises a rear leading edge element 510 configured to be attached to the leading edge 260. The front leading edge element 520 is connected to the rear leading edge element 510. The front 520 and rear 510 leading edge elements form an air channel 540 between them.

That is to say, if a rear leading edge element 510 is present, the air channel 540 is formed between the front 520 and rear 510 leading edge elements instead of between the front leading edge element 520 and the leading edge 260.

Having a rear leading edge element 510 may help to protect the leading edge 260. It may also facilitate the attachment of the device 300 to the blade 22.

The rear leading edge element 510 may be configured to extend along the leading edge 260. For example, the rear leading edge element 510 may be configured to extend between 10% and 90% of a (total) length 230 of a wind turbine blade 22, and in particular between 50% and 80% of a (total) length 230 of the wind turbine blade 22. In some examples, the device 300 may be arranged as close as possible to the tip 220. Extension of the device 300 along the blade 22 may be counted from the tip 220 in these examples. Depending on the total length of a device, e.g. a total length 430 of the front leading edge element, more than one device 300 may be attached to the leading edge 260.

As illustrated in the example of FIG. 4C, a total length 430 of the front leading edge element 520 may be substantially equal to a total length 450 of the rear leading edge element 510. In other examples, the total lengths 430, 450 may be different.

A distance 415 between the front leading edge element 520 and the rear leading edge element 510 may be substantially constant or may be variable. For example, a distance 415 between the front 520 and rear 510 leading edge elements may increase in a spanwise direction (from root to tip or from tip to root). The device 300 may be attached to a wind turbine blade 22 such that a distance 415 between the front 520 and rear 510 leading edge elements increases towards a root 210 of the blade 22. A length of the connectors 530 joining the front 520 and rear 510 leading edge element may be selected for providing different distances 415 between the front 520 and back 510 pieces.

In some other examples, a distance 415 between the front 520 and rear 510 leading edge elements may be substantially constant, e.g. the front 520 and rear 510 leading edge elements may have a substantially constant distance 415 along an entire length of the elements 430, 450.

Likewise the front leading edge element 520, a shape of the rear leading edge element 510 may be adapted to increase air flow diversion from the blade 22.

A rear leading edge element 510 may have a variable width 440 along a length of the rear leading edge element 510. A width 440 of the element 510 may vary along substantially an entire length 450 of the element 510, or along one or more portions of the element 520. For example, a width 440 of the rear leading edge element 510 may vary, e.g. increase, along a substantially total length 450 of the element 510. In some other examples, a width 440 of the rear leading edge element 510 may vary, e.g. increase, along one or more portions of the element 510. For example, a longitudinal end region 550 of the rear leading edge element 510 may widen. A device 300 may be attached to a wind turbine blade 22 such that a width 400 of a rear leading edge element 510 increases towards a blade root 210 of the wind turbine blade 22. For example, as schematically illustrated in FIG. 4C, a longitudinal end region 550 of the rear leading edge element 510 may widen towards the blade root 210 when the device 300 is attached to the blade 22. In this particular example, a distance 415 between the front 520 and rear 510 leading edge pieces decreases when the longitudinal end region 550 widens. Depending on the shape of the front leading edge element 520 and on the length of the connectors 530, this may not happen in other examples.

Having an increasing length of the rear leading edge element 510 towards a root 210 of a wind turbine blade 22 may help to deflect the air flow and from the blade 22.

In some examples, an air channel side 511 of the rear leading edge element 510, i.e., a side of the rear leading edge element facing an air channel 540, may be concave. This may help to direct the air flow away from the blade 22. In FIG. 4B, the air channel side 511 of the rear leading edge element 510 is depicted as straight, but in other examples the air channel side 511 may have a recess forming a concave shape. Other shapes of the air channel side 511 may be possible.

A front leading edge element 520, and a rear leading edge element 510 if present, may be lightweight. They may be made of foam in some examples.

In some examples, as e.g. as illustrated in FIG. 4B, device 300 may further comprise a protruding portion 310' configured to protrude beyond the trailing edge 270 in a local chordwise direction. The portion 310' configured to protrude beyond the trailing edge 270 is configured to at least partially form an air channel 540' behind the trailing edge 270. An air channel 540 in front of the leading edge 260 may be referred to as leading air channel 540, and an air channel 540' behind the trailing edge 270 may be referred to as trailing air channel 540'.

The description above with respect to the protruding portion 310 configured to protrude beyond the leading edge 260 applies *mutatis mutandis* to the protruding portion 310' configured to protrude beyond the trailing edge 270. For example, the explanations with respect to the front and rear elements, distances 410 to the leading edge and between 415 the front and rear elements, widening 440 of the front and rear elements, shapes 511, 521, 522 of the front and rear elements, and connectors 530 are likewise applicable to a protruding portion 310' configured to be attached to a trailing edge 270.

Depending on how the protruding portions 310, 310' are to be attached to the blade 22, they may be provided in a single device 300 or as separate devices 300. For example, a device 300 comprising two or more straps connecting the protruding portion 310 configured to protrude beyond the leading edge 260 and the protruding portion 310' configured to protrude beyond the trailing edge 270 may be provided. If a protruding portion 310, 310' may be attached to a blade 22 on its own, e.g. by fitting a rear leading edge element 510 to the leading edge 260, two devices 300 may be provided.

A protruding portion 310' configured to protrude beyond the trailing edge 270 may comprise a front trailing edge element 520'. The front trailing edge element 520' may be configured to be attached to the trailing edge 270 in some examples. In other examples, the protruding portion 310' may further comprise a rear trailing edge element 510' configured to be attached to the trailing edge 270, and the front trailing edge element 520' may be connected to the rear trailing edge element 510'.

With respect to the terms front and rear, it may be understood that in case a rear leading edge element 510 (rear trailing edge element 510') is present, a front leading edge element 520 (front trailing edge element 520') is configured to be further away from the leading edge 260 (trailing edge 270) than the rear leading edge element 510 (rear trailing edge element 510').

Depending on the presence of the rear trailing edge element 510', one or more air channels 540 may be formed between the front trailing edge element 520' and the trailing edge 270, or between the front trailing edge element 520' and the rear trailing edge element 510'.

The air flow around the trailing edge 270 may therefore be deviated away from the wind turbine blade 22 as explained before. Accordingly, wind turbine vibrations may be reduced by placing a protruding portion 310' on the trailing edge 270.

Having a protruding portion 310 along the leading edge 260 and a protruding portion 310' along the trailing edge 270 may enhance the effect of leading air flow and vortex filaments away from the blade 22, and thus avoiding or at least reducing its combination after they have passed the leading 260 and trailing 270 edges. Also, the forces of the air flowing around the wind turbine blade 22 may be more balanced if using a leading edge protruding portion 310 and a trailing edge protruding portion 310'.

Fasteners such as straps may be used for attaching a device 300 to the leading edge 260 and/or the trailing edge 270. Other ways of attaching a device 300 to a wind turbine blade 22 may be possible.

In a second aspect of the disclosure, a device 300 configured to be removably mounted to a wind turbine blade 22 is provided. The wind turbine 22 has a root 210, a tip 220 and exterior surfaces extending in a generally spanwise direction from the root 210 to the tip 220 and defining a pressure side 240, a suction side 250, a leading edge 260 and a trailing edge 270. The device 300 is configured for mitigating vibrations of a wind turbine 10 when a rotor 18 of the wind turbine 10 is in standstill. The device 300 comprises a leading edge element 310 configured to protrude beyond the leading edge 260 in a local chordwise direction and a trailing edge element 310' configured to protrude beyond the trailing edge 270 in a local chordwise direction. The portion 310 configured to protrude beyond the leading edge 260 is configured to at least partially form a leading air channel 540 in front of the leading edge 260. The portion 310' configured to protrude beyond the trailing edge 270 is configured to at least partially form a trailing air channel 540' behind the trailing edge 270.

The explanations provided with respect to FIGS. 4A-4C, in particular to the leading 310 and trailing 310' edge elements, are applicable to the device 300 and leading 310 and trailing 310' edge elements of this aspect.

In some examples, the portion 310 configured to protrude beyond the leading edge 260 may comprise a front leading edge element 520 configured to be connected to the leading edge 260 such that the leading air channel 540 is formed between the front leading edge element 520 and the leading edge 260. In these or other examples, the portion 310' configured to protrude beyond the trailing edge 270 may comprise a front trailing edge element 520' configured to be connected to the trailing edge 270 such that the trailing air channel 540' is formed between the front trailing edge element 520' and the trailing edge 270.

In some examples, the front leading edge element 520 may be configured to have a varying distance 410 to the leading edge 260. In these or other examples, the front trailing edge element 520' may be configured to have a varying distance to the trailing edge 270.

In some examples, the front leading edge element 520 may be configured to be substantially parallel to the leading edge 260. In these or other examples, the front trailing edge element 520' may be configured to be substantially parallel to the trailing edge 270.

In some examples, a leading air channel side 521 of the front leading edge element 520 may be convex. In these or other examples, a trailing air channel side of the front trailing edge element 520' may be convex.

In some examples, a side 522 of the front leading edge element 520 opposite to the leading air channel side 521 may be concave. In these or other examples, a side of the front trailing edge element opposite to the trailing air channel side may be concave.

In some examples, the portion 310 configured to protrude beyond the leading edge 260 further comprises a rear leading edge element 510 configured to be attached to the leading edge 260, wherein the front leading edge element 520 is connected to the rear leading edge element 510, and wherein the front and rear leading edge elements 520, 510 form a leading air channel 540 between them.

In these or other examples, the portion 310' configured to protrude beyond the trailing edge 270 further comprises a rear trailing edge element 510' configured to be attached to the trailing edge 270, wherein the front trailing edge element 520' is connected to the rear trailing edge element 510', and wherein the front and rear trailing edge elements 520', 510' form a trailing air channel 540' between them.

In some examples, the rear leading edge element 510 and/or the rear trailing edge element 510' may be configured to extend along the leading edge 260 between 10% and 90% of a (total) length 230 of a wind turbine blade 22, and in particular between 50% and 80% of a (total) length 230 of the wind turbine blade 22.

In some examples, a width 440 of the rear leading edge element 510 may increase along a length of the rear leading edge element 510. In these or other examples, a width of the rear trailing edge element 510' may increase along a length of the rear trailing edge element 510'.

In some examples, a leading air channel side 511 of the rear leading edge element 510 may be concave. In these or other examples, a trailing air channel side of the rear trailing edge element 510' may be concave.

Details about the trailing edge portion 310' which have been made explicit with regard to this second aspect may be of course incorporated to the trailing edge portion 310' referred to in the first aspect of this disclosure.

In a third aspect of the disclosure, a method 600 for mitigating vibrations of a parked wind turbine comprising one or more wind turbine blades, a blade having a root, a tip and exterior surfaces defining a pressure side, a suction side, a leading edge and a trailing edge, each surface extending in a generally spanwise direction from the root the tip, is provided. A wind turbine may be parked during installation, commissioning and maintenance of the wind turbine.

Figure 5:
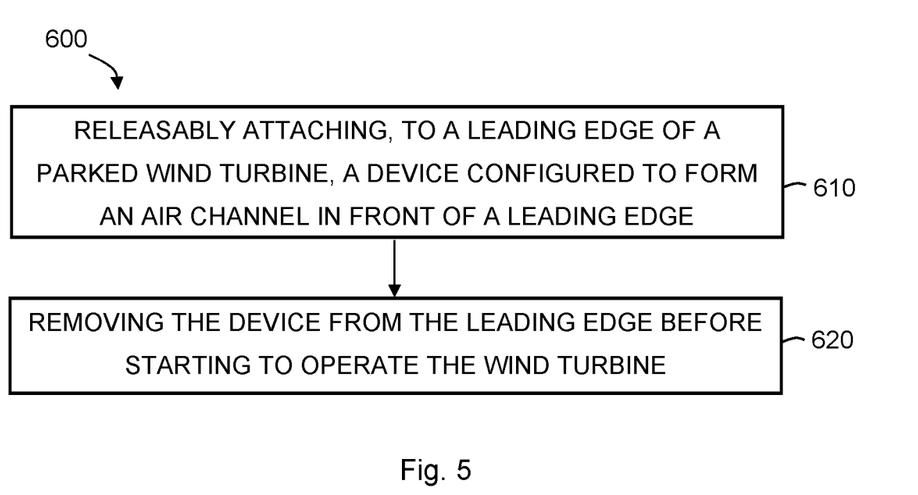
FIG. 5 schematically illustrates a flow chart of a method for mitigating vibrations of a parked wind turbine.

As illustrated in FIG. 5, the method comprises, at block 610, releasably attaching a device 300 comprising a projection 310 configured to protrude in a local chordwise direction beyond the leading edge 260 of a wind turbine blade 22 to the leading edge 260 of a wind turbine blade 22. The portion (310) configured to protrude beyond the leading edge (260) is configured to at least partially form an air channel (540) in front of the leading edge (260).

When mounted to a parked wind turbine blade, the VIVs and/or SIVs acting on the wind turbine blade 22, and in general on the wind turbine 10, may be mitigated.

In some examples, releasably attaching may comprise fitting the portion configured to protrude 310 to the leading edge 260. Fitting may include pressing or clamping a surface of the projection 310 configured to be facing the leading edge 260 to the leading edge 260.

In some other examples, fasteners such as a plurality of straps may be used to secure the portion 310 to the wind turbine blade 22 by tightening the straps around the blade 22. The straps may be connected or connectable to a rear leading edge element 510.

Still in other examples, tape or any adhesive which may allow removable attachment may be used to join the projection 310 to the leading edge 260.

In some examples, a device 300 may be releasably attached to a wind turbine blade 22 such that a distance 410 of a front leading edge element 520 increases towards a blade root 210 of the wind turbine blade 22.

In some examples, a device 300 may be releasably attached to a wind turbine blade 22 such that a distance 415 between the front 520 and rear 510 leading edge elements increases towards a root 210 of the blade 22.

In some examples, a device 300 may be releasably attached to a wind turbine blade 22 such that a width 400 of a rear leading edge element 510 increases towards a blade root 210 of the wind turbine blade 22.

Diverting air flow 515 away from a wind turbine blade 22 and avoiding or at least reducing its combination after passing it surrounds the leading 260 and trailing 270 edges may be facilitated by orienting a device 300 as indicated in the above paragraphs.

Attachment to a blade 22 may be performed on the ground, e.g. before or after a blade 22 has been mounted to a hub 20, the hub 20 being on the ground. Attachment may also be performed after a blade 22 has been mounted to a hub 20, the hub 20 being already mounted to a top of a wind turbine tower 15.

If the device 300 further comprises a trailing edge projection 310' (or a trailing edge projection 310' is provided as part of another device 300), the method may further comprise attaching the trailing edge projection 310' to the trailing edge 270.

Any of the ways of attaching the leading edge projection 310 may be used to attach the trailing edge projection 310'. For example, two or more straps connecting or configured to connect both portions 310, 310' and fix them to the blade 22 may be used.

Method 600 further includes, at block 620, removing the device 300 from the leading edge 260 before starting to operate the wind turbine 10. This may e.g. be after installation and commissioning of the wind turbine 10 or after maintenance of the wind turbine 10.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A device (300) configured to be removably mounted to a wind turbine blade (22) having a root (210), a tip (220) and exterior surfaces extending in a generally spanwise direction from the root (210) to the tip (220) and defining a pressure side (240), a suction side (250), a leading edge (260) and a trailing edge (270);
the device (300) being configured for mitigating vibrations of a wind turbine (10) when a rotor (18) of the wind turbine (10) is in standstill;
the device (300) comprising a portion (310) configured to protrude beyond the leading edge (260) in a local chordwise direction; and
the portion (310) configured to protrude beyond the leading edge (260) being configured to at least partially form an air channel (540) in front of the leading edge (260), the portion (310) comprising a front leading edge element (520) configured to be connected to the leading edge (260) such that the air channel (540) is formed between the front leading edge element (520) and the leading edge (260).

2. The device of claim 1, wherein the front leading edge element (520) is configured to have a varying distance to the leading edge (260).

3. The device of claim 1, wherein an air channel side (521) of the front leading edge element (520) is convex.

4. The device of claim 3, wherein a side (522) of the front leading edge element (520) opposite to the air channel side (521) is concave.

5. The device of claim 1, wherein the portion (310) configured to protrude beyond the leading edge (260) further comprises a rear leading edge element (510) configured to be attached to the leading edge (260);
wherein the front leading edge element (520) is connected to the rear leading edge element (510); and
wherein the front and rear leading edge elements (520, 510) form the air channel (540) between them.

6. The device of claim 5, wherein the rear leading edge element (510) is configured to extend along the leading edge (260) between 10% and 90% of a length (230) of a wind turbine blade (22).

7. The device of claim 5, wherein an air channel side (511) of the rear leading edge element (510) is concave.

8. The device of claim 5, further comprising a protruding portion (310') configured to protrude beyond the trailing edge (270) in the local chordwise direction, the protruding portion (310') being configured to at least partially form an air channel (540') behind the trailing edge (270).

9. The device of claim 8, wherein the protruding portion (310') configured to protrude beyond the trailing edge (270) comprises a front trailing edge element (520') configured to be connected to the trailing edge (270) such that the air channel (540') behind the trailing edge (270) is formed between the front trailing edge element 520' and the trailing edge (270).

10. The device of claim 9, wherein the protruding portion (310') configured to protrude beyond the trailing edge (270) further comprises a rear trailing edge element (510') configured to be attached to the trailing edge (270), the front trailing edge element (520') is connected to the rear trailing edge element (510') and the front and rear trailing edge elements (520', 510') form the air channel (540') behind the trailing edge (270) between them.

11. A wind turbine blade (22) comprising the device (300) according to claim 1 attached to the blade (22).

12. A method (600) for mitigating vibrations of a parked wind turbine (10) in a standstill, the wind turbine (10) comprising one or more wind turbine blades (22), the wind turbine blades (22) each having a root (210), a tip (220) and exterior surfaces defining a pressure side (240), a suction side (250), a leading edge (260) and a trailing edge (270), extending in a generally spanwise direction from the root (210) to the tip (220); the method comprising:
releasably attaching (610) a device (300) to the leading edge (260) of a wind turbine blade (22), the device (300) comprising a portion (310) configured to protrude beyond the leading edge (260) in a local chordwise direction, and the portion (310) configured to protrude beyond the leading edge (260) being configured to at least partially form an air channel (540) in front of the leading edge (260), the portion (310) comprising a front leading edge element (520) configured to be connected to the leading edge (260) such that the air channel (540) is formed between the front leading edge element (520) and the leading edge (260); and
detaching (620) the device (300) from the blade (22) before the wind turbine (10) starts to operate.

13. The method of claim 12, wherein the device (300) is attached such that a distance (410) between the front leading edge element (520) of the device (300) and the leading edge (260) and/or a distance (415) between the front leading edge element (520) of the device (300) and a rear leading edge element (510) of the device (300) increases towards the blade root (210) of the wind turbine blade (22).

14. The method of claim 12, wherein the device (300) is attached such that a width (400) of a rear leading edge element (510) of the device (300) increases towards the root (210) of the wind turbine blade (22).

* * * * *